United States Patent

Broadhead et al.

[11] 3,864,167
[45] Feb. 4, 1975

[54] NON-AQUEOUS BATTERY USING CHALCOGENIDE ELECTRODE

[75] Inventors: John Broadhead, Morristown; Francis Joseph Di Salvo, Jr., Florham Park; Forrest A. Trumbore, Summit, all of N.J.

[73] Assignee: Bell Telephone Laboratories, Incorporated, Murray Hill, N.J.

[22] Filed: Apr. 19, 1973

[21] Appl. No.: 352,514

[52] U.S. Cl. .......................... 136/6 LN, 136/20
[51] Int. Cl. .......................... H01m 35/02
[58] Field of Search ............ 136/6 LN, 6 R, 20, 83, 136/100

[56] References Cited
UNITED STATES PATENTS

| | | | |
|---|---|---|---|
| 3,476,601 | 11/1969 | Berger | 136/20 |
| 3,508,967 | 4/1970 | Lyall | 136/6 LN |
| 3,639,174 | 2/1972 | Kegelman | 136/6 LN |
| 3,681,144 | 8/1972 | Dey et al | 136/83 R |
| 3,685,983 | 8/1972 | Louzos | 136/20 |
| 3,730,771 | 5/1973 | Tannenberger et al. | 136/6 LN |
| 3,772,083 | 11/1973 | Mead | 136/83 R |
| 3,773,558 | 11/1973 | Charbonnier | 136/6 LN |
| 3,791,867 | 2/1974 | Broadhead | 136/6 R |

Primary Examiner—T. Tung
Assistant Examiner—C. F. Lefevour
Attorney, Agent, or Firm—W. G. Nilsen

[57] ABSTRACT

A particular class of transition-metal chalcogenides which have a fibrous structure are found to exhibit particularly desirable secondary battery characteristics. Fibrous structure is retained on discharge and charge which contributes to the maintenance of large energy densities after extensive recycling.

7 Claims, 2 Drawing Figures

PATENTED FEB 4 1975 3,864,167

NON-AQUEOUS BATTERY USING CHALCOGENIDE ELECTRODE

BACKGROUND OF THE INVENTION

1. Field of the Invention

The invention relates to non-aqueous batteries and in particular to non-aqueous batteries with positive electrodes in which the active materials have novel compositions.

2. Description of the Prior Art

There has been considerable interest in recent years in non-aqueous batteries. An attractive feature of these batteries is their potentially high voltage which results largely from the fact that, without the presence of water, hydrogen is not liberated by electrolytic reduction. Because of these high voltages such batteries have potentially high energy densities. Particularly attractive are non-aqueous batteries using lithium negative electrodes since the lithium standard potential is quite high and its density is quite low so that such electrodes have exceptionally high energy densities (see for example *High Energy Batteries* by R. Jasinski, Plenum Press, New York, 1967, page 141). Similar statements can be made for other Group I and Group II elements such as sodium, potassium and magnesium.

At high rates of discharge, the energy density of an electrode depends, in large extent, on conductivity of the material used in the positive electrode. Thus, for example, metal salts such as copper fluoride are limited in usefulness because of lack of conductivity. Similar statements can be made for halogens, chalcogens and many nonconducting metal salts.

Attempts have been made to improve the discharge characteristics and energy density of halogen and chalcogen electrodes by intercalating such materials in a host material which improves the conductivity of the electrode and allows rapid and complete discharge. Such intercalation improves the shelf life of the battery by preventing self-discharge due to dissolution of active material in the battery electrolyte. Further, it inhibits dendritic growth which prevents battery malfunction due to short-out. However, these approaches reduce the capacity of the positive electrode due to the presence of inert host material which does not contribute battery action.

A recently issued patent (U.S. Pat. No. 3,681,144) describes a class of metal-selenides which when used in positive electrodes yields high utilizations and steady output voltage but only primary battery performance.

Problems which have limited the usefulness of non-aqueous batteries are associated with their secondary battery performance. Although the mechanism by which particular electrodes are prevented from being recharged are not well understood, it is known that a large number of substances with high energy densities as evidenced by their use in primary cells have drastically reduced energy densities when used as secondary cells. Many materials do not operate as secondary cells because of the change in morphology on cell discharge.

SUMMARY OF THE INVENTION

The invention is a nonaqueous secondary cell in which the positive electrode contains as the active material a specified class of transition-metal chalcogenide. These compounds evidence a fibrous structure which is retained on discharge. This allows for effective operation as secondary cells. The transition metal is selected from groups IV, V and VI and chalcogenide refers to sulfide and selenide. Specific examples are niobium triselenide, tantalum trisulfide, titanium trisulfide, niobium trisulfide, tungsten trisulfide and tantalum triselenide. The large surface area exhibited by the fibrous structure allows for high utilization of the active material on charge and discharge.

The fibers in the active material have a variety of sizes and shapes depending on the extent of growth of each fiber. The fibers have a length of at least 1 micron and typically have aspect ratios of from 5:1 to 1000:1. They vary in cross-section from round to triangular and some rectangular (ribbon-like fibers). Although invention does not depend on method of preparation of these materials, a preferred method is described in the detailed description section. A large variety of electrolytes are compatible with this positive electrode, including $LiClO_4$ dissolved in propylene carbonate. To prevent dissolution of the charge products of the positive electrodes by incorporation of $ClO_4^-$ ions in the active material (which enhances solubility of the active material) a substance may be dissolved in the propylene carbonate which consists of the cation of the discharge product of the negative electrode and anion of the discharge product of the positive electrode ($Li_2Se$ in the case of a Li negative electrode and transition-metal triselenide positive electrode). Other compatible electrolytes may also be used including molten electrolyte.

DETAILED DESCRIPTION

1. Preparation of the Cell

Figure 1:
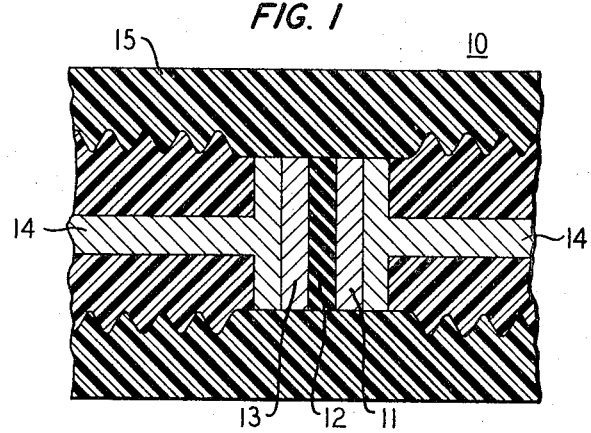
FIG. 1 is a side view in section of a battery employing a positive electrode with a transition-metal chalcogenide as the active material and a conventional negative electrode and conventional electrolyte.

The positive electrode of the cell can be made in a variety of ways. For example, the active material can be compressed into pellets and an electrode incorporated to collect current. These operations should be carried out in the absence of moisture, as, for example, in a dry box.

A particularly attractive cell structure from the point of view of capacity and ease of fabrication is a thin film positive electrode. A thin foil of the transition metal is reacted at its surface with the chalcogen vapor to form the active material. Unreacted transition metal is used as the current collector. This is then stacked with the other components of a battery to make a highly compact battery structure.

The negative electrode is conventional. It can be made by pressing the active material in the form of a pellet or it can also be made in the form of a thin film. Particularly attractive are negative electrodes made from Group I metals such as lithium, sodium and potassium. These can be made in the form of a thin sheet and stacked with the other components of the battery to form a compact structure. Other metals, less active, can also be used. For example, magnesium combines relatively high voltage with ease of handling.

The electrolyte used in the battery is also conventional. It should be recognized, however, that these electrolytes should be inert to both the materials in the positive and the negative electrode. A salt such as LiClO$_4$ dissolved in propylene carbonate is a typical electrolyte. Also advantageous is the use of a molten salt electrolyte such as LiAlCl$_4$, tetrabutylammonium chloride and KAlCl$_4$ (for a battery with a potassium negative electrode). Batteries using molten salts have exceptionally high charge and discharge rates. With molten electrolytes, battery geometry depends on densities of the various electrode materials. For example, the positive electrode might be below the molten electrolyte and a negative electrode with lower density (which might be molten) would float on top of the molten electrolyte.

In general, battery fabrication may be carried out to yield the battery in either the charged or the discharged state. Particularly attractive is a procedure for making the battery in the charged state. For example, in a lithium-niobium triselenide battery lithium metal is used in the negative electrode and niobium triselenide is used in the positive electrode. When battery fabrication is complete the battery is ready for use and after discharge the battery may be recharged.

2. Preparation of the Active Material

The distinguishing feature of transition-metal chalcogenides is that they exist in at least two oxidation states. For example, compounds formed from niobium and selenium may exist as NbSe$_3$ and NbSe$_2$.

Although method of preparation is not critical to operation of these batteries, the following method of preparation is found to give exceptionally good results. The method of preparation is illustrated for the case of niobium triselenide. A thin foil of niobium is first degreased and cleaned by conventional means. These thin foils are then reacted with selenium vapor in a sealed evacuated fused quartz ampoule. The ampoule is designed to prevent liquid selenium from contacting the niobium. The sealed ampoule is then placed in a furnace so as to allow vapor reaction of the selenium with the niobium. Excess selenium is maintained in the reaction vessel throughout the reaction.

An understanding of the growth mechanism will show how the niobium triselenide is obtained. On heating to the vicinity of 300° C, a cottony material is formed on the niobium metal. No fibrous material is formed up to 600° C. Above this temperature, at 650° C, fibrous material is formed which continues to grow provided excess selenium is present. Higher temperatures allow for more rapid formation of the fibrous compound but maximum temperature is limited by practical considerations such as excess pressure of selenium and too rapid reaction so that no niobium metal remains to act as a current collector for the electrode. Temperatures over 1,000° C do not provide any advantages. The minimum temperature for formation of the fibrous material changes with compound. The sulfides form at lower temperatures (around 500° C). Heating times typically vary from a few minutes to 100 hours.

Typical examples of conditions for yielding transition-metal chalcogenides with fibrous structure are given in the table below

|  | Temperature (Degrees C) | Time (Hours) |
|---|---|---|
| NbSe$_3$ | 660 | 3.3 |
| NbS$_3$ | 500 | 24 |
| TaSe$_3$ | 650 | 0.8 |
| TaS$_3$ | 500 | 60 |
| TiS$_3$ | 520 | 10 |

These compounds are also synthesized by an open tube process. Here, the chalcogenide is brought in contact with the transition metal by use of an inert carrier gas. Such a process is preferred where large quantities of material are to be made.

3. Characteristics of the Cell

Figure 2:
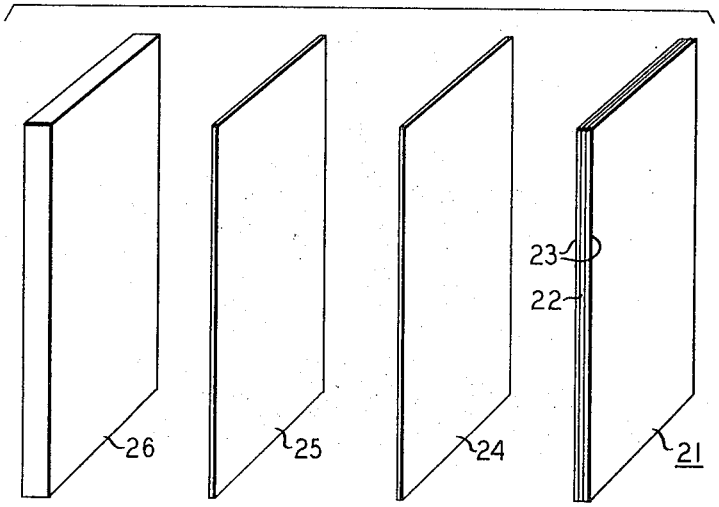
FIG. 2 is an exploded view which shows the components of a thin film battery with positive electrode employing a transition-metal chalcogenide as the active material.
Figure 3:
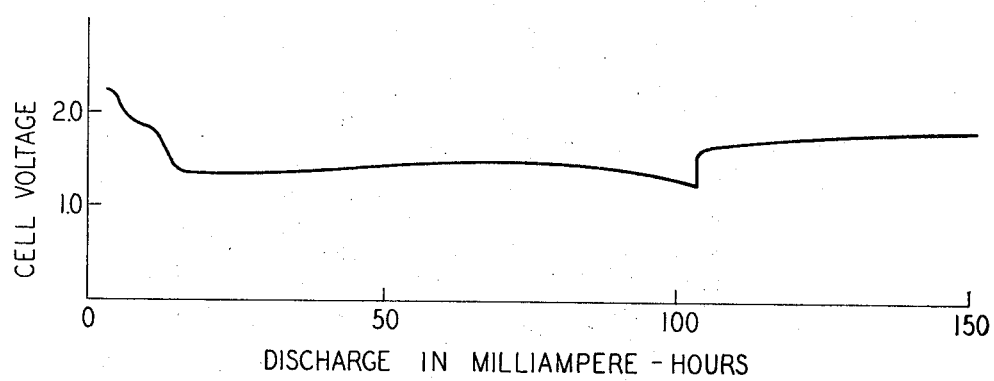
FIG. 3 is a graph which presents data on cell voltage as a function of discharge.

Various cell structures were used in determining the characteristics of these cells. FIG. 1 shows one such cell and FIG. 2 shows the components of another type cell which can be either put together in a flat or rectangular configuration or by incorporation of suitable additional separators may be rolled into a cylindrical battery configuration. These batteries are discharged at various rates and recharged at various rates to determine not only their capacity, but also their secondary battery performance. Typical results are shown in FIG. 3. This figure shows data on the cell voltage as a function of discharge. As can be seen, the capacity is quite high and voltage is maintained reasonably constant over the capacity of the battery. Discharge rate is 5mA corresponding to 0.5mA/Cm$^2$ for the particular cell tested. Of even greater importance is the fact that these batteries not only are rechargeable, but also maintain a large fraction of their capacity after being recharged a large number of times.

Other transition-metal chalcogenides also yield attractive capacities. For example, under conditions where NbSe$_3$ yields a capacity of 49 mA-hours, NbS$_3$ yields 11 mA-hours, TaSe$_3$ yields 37 mA-hours, TaS$_3$ yields 15–20 mA-hours and TiS$_3$ yields 14 mA-hours. Optimization of conditions is likely to yield higher capacities.

4. The Figures

FIG. 1 shows a side view of a cell structure 10 with a negative electrode 11, a separator 12 impregnated with an electrolyte and a positive electrode 13 containing the transition-metal chalcogenide as the active electrode material. Also shown are the current collectors 14 on both sides of the structure and the surrounding structure 15 usually made of an inert, non-conducting material.

FIG. 2 shows the cell components of a thin film battery including the positive electrode 21 composed of niobium metal 22 and thin films of niobium triselenide 23. Also shown is the separator 24 and the negative electrode 25. The battery may be assembled in a variety of ways including putting the various sheets together to form a rectangular battery or rolling in the form of a cylinder. The battery has an outer hard material or can material 26 to protect it from moisture and oxygen. The capacity of the battery can be increased in various ways. For example, the area of the thin films may be increased. Also, additional layers of negative electrode, separator and positive electrode may be incorporated into the battery. It should be realized that separator material is used between the positive and negative electrode. Also, suitable electrical connections are made to obtain series or parallel operation.

What is claimed is:

1. A non-aqueous secondary power supply comprising at least one cell, said cell comprising an electrolyte, negative electrode with active negative electrode material and positive electrode with active positive electrode material, characterized in that the said active positive electrode material consists essentially of a transition-metal chalcogenide selected from the group consisting of niobium triselenide, tantalum trisulfide, titanium trisulfide, niobium trisulfide, and tantalum triselenide and said active positive electrode material has a fibrous structure which persists in both charged and discharged state in which the fibers are at least 1 micron in length and have aspect ratios from 5:1 to 1000:1.

2. The power supply of claim 1 in which the active negative electrode material consists essentially of lithium.

3. The power supply of claim 1 in which the active negative electrode material consists essentially of sodium.

4. The power supply of claim 1 in which the active negative electrode material consists essentially of magnesium.

5. The power supply of claim 1 in which the electrolyte consists essentially of $LiClO_4$ dissolved in propylene carbonate.

6. The power supply of claim 1 in which the electrolyte consists essentially of a molten salt.

7. The power supply of claim 1 in which the active positive electrode material consists essentially of niobium triselenide, the active negative electrode material consists essentially of lithium and the electrolyte consists essentially of $LiClO_4$ dissolved in propylene carbonate with $(Li)_2Se$ dissolved in the electrolyte.

* * * * *

UNITED STATES PATENT OFFICE
CERTIFICATE OF CORRECTION

PATENT NO. : 3,864,167
DATED : February 4, 1975
INVENTOR(S) : John Broadhead, Francis Joseph Di Salvo, Jr., and Forrest Allen Trumbore It is certified that error appears in the above-identified patent and that said Letters Patent are hereby corrected as shown below:

Change last inventor's name from "Forrest A. Trumbore" to --Forrest Allen Trumbore--.

Signed and sealed this 29th day of April 1975.

(SEAL)
Attest:

RUTH C. MASON
Attesting Officer

C. MARSHALL DANN
Commissioner of Patents
and Trademarks